July 7, 1959 W. D. BUCKINGHAM ET AL 2,894,066

FACSIMILE TRANSMITTER FOR TELEGRAPH MESSAGE BLANKS AND THE LIKE

Filed Dec. 29, 1955 8 Sheets-Sheet 1

INVENTORS
W. D. BUCKINGHAM
G. H. RIDGE
L. D. ROOT
F. T. TURNER

BY

V. F. Presson
ATTORNEY

*INVENTORS*
W. D. BUCKINGHAM
G. H. RIDGE
L. D. ROOT
F. T. TURNER

*BY* W. F. Presson
ATTORNEY

INVENTORS
W. D. BUCKINGHAM
G. H. RIDGE
L. D. ROOT
F. T. TURNER

BY

H. F. Presson

ATTORNEY

July 7, 1959 W. D. BUCKINGHAM ET AL 2,894,066

FACSIMILE TRANSMITTER FOR TELEGRAPH MESSAGE BLANKS AND THE LIKE

Filed Dec. 29, 1955 8 Sheets-Sheet 4

INVENTORS
W. D. BUCKINGHAM
G. H. RIDGE
L. D. ROOT
F. T. TURNER

BY

[signature]

ATTORNEY

July 7, 1959 W. D. BUCKINGHAM ET AL 2,894,066
FACSIMILE TRANSMITTER FOR TELEGRAPH
MESSAGE BLANKS AND THE LIKE
Filed Dec. 29, 1955 8 Sheets-Sheet 5

INVENTORS
W. D. BUCKINGHAM
G. H. RIDGE
L. D. ROOT
F. T. TURNER
BY
[signature]
ATTORNEY INVENTORS
W. D. BUCKINGHAM
G. H. RIDGE
L. D. ROOT
F. T. TURNER
BY
N F Presson
ATTORNEY INVENTORS
W. D. BUCKINGHAM
G. H. RIDGE
L. D. ROOT
F. T. TURNER
BY
H. F. Presson
ATTORNEY July 7, 1959 W. D. BUCKINGHAM ET AL 2,894,066

FACSIMILE TRANSMITTER FOR TELEGRAPH MESSAGE BLANKS AND THE LIKE

Filed Dec. 29, 1955 8 Sheets-Sheet 8

INVENTORS
W. D. BUCKINGHAM
G. H. RIDGE
L. D. ROOT
F. T. TURNER

BY

ATTORNEY

United States Patent Office 2,894,066

Patented July 7, 1959

2,894,066

FACSIMILE TRANSMITTER FOR TELEGRAPH MESSAGE BLANKS AND THE LIKE

William D. Buckingham, Southampton, Guy H. Ridge, Water Mill, Lawrence D. Root, Southampton, and Frank T. Turner, Hampton Bays, N.Y., assignors to The Western Union Telegraph Company, New York, N.Y., a corporation of New York Application December 29, 1955, Serial No. 556,197

19 Claims. (Cl. 178—7.1)

This invention relates to facsimile transmitters embodying scanning apparatus adapted for optical flat-sheet scanning of telegrams, letters, or other message blanks bearing the subject matter to be transmitted, and more particularly to novel and improved structure which facilitates the insertion and proper initial position of a message blank in the transmitter and for advancing different portions of the message blank through the transmitter at different speeds in a manner to appreciably reduce the time normally occasioned when those portions of the blanks preceding and following the message are passing the scanning line position. The instant invention relates generally to a facsimile transmitter of the character disclosed in the copending U.S. application of W. D. Buckingham et al., Serial No. 486,252, filed February 4, 1955, and assigned to the assignee of the instant case.

In accordance with the instant invention, a telegram, letter or other subject-matter blank is dropped into a loading slot within which are retractile members that initially locate the blank at the proper starting position to have applied thereto a time stamp which, in response to a start signal, stamps on an appropriate area of the blank the year, month, day, hour and minute when transmission of the message is started. After the time stamp is operated, feed rollers engage the blank, the retractile members which held the blank in starting position are retracted, and the blank is fed through the transmitter at a fast rate until the initial portion or printed heading of the blank has passed the scanning line position and the beginning of the message or other subject matter appears adjacent to the scanning line position, whereupon the blank is fed at a proper reduced scanning rate until scanning of the message is completed. At this time the blank again is advanced through the transmitter at a fast rate and is guided into a "sent message" compartment. The scanning line position referred to is established by a scanning light beam that repeatedly travels transversely across the blank in a predetermined linear scanning path as the blank is advanced at the scanning rate.

The transmitter may be started by a signal produced locally by an attendant or by a remote signal received over the line from a recorder or from a concentrator having a number of incoming and outgoing lines for selective interconnection.

Among the objects of the invention are to provide improved transmitting apparatus having means to facilitate the insertion of a subject-matter blank and for automatically locating the blank in proper position preparatory to a scanning operation; the provision of metered feed means for causing fast feed of the blank from the automatically located position of the blank and during the time required for advancing the initial portion or heading of the blank past the scanning line position; to provide an improved indicator device manually settable to preselect the place on the blank where transmission is to be terminated and which determines the time at which fast feed of the blank shall again commence following the completion of the message-scanning operation; and means automatically operative to return the indicator device to such a position that the full length of a subsequent message will be transmitted unless the attendant manually adjusts the device prior to initiating transmission of the subsequent message.

Other objects and advantages of the invention will be apparent from the following detailed description, taken in connection with the accompanying drawings, in which:

Fig. 1 is a plan view of the sheet feed unit for the message blanks;

Figs. 2 and 3 when joined along line A—A, show a front view, in elevation, of the unit of Fig. 1;

Figure 2:
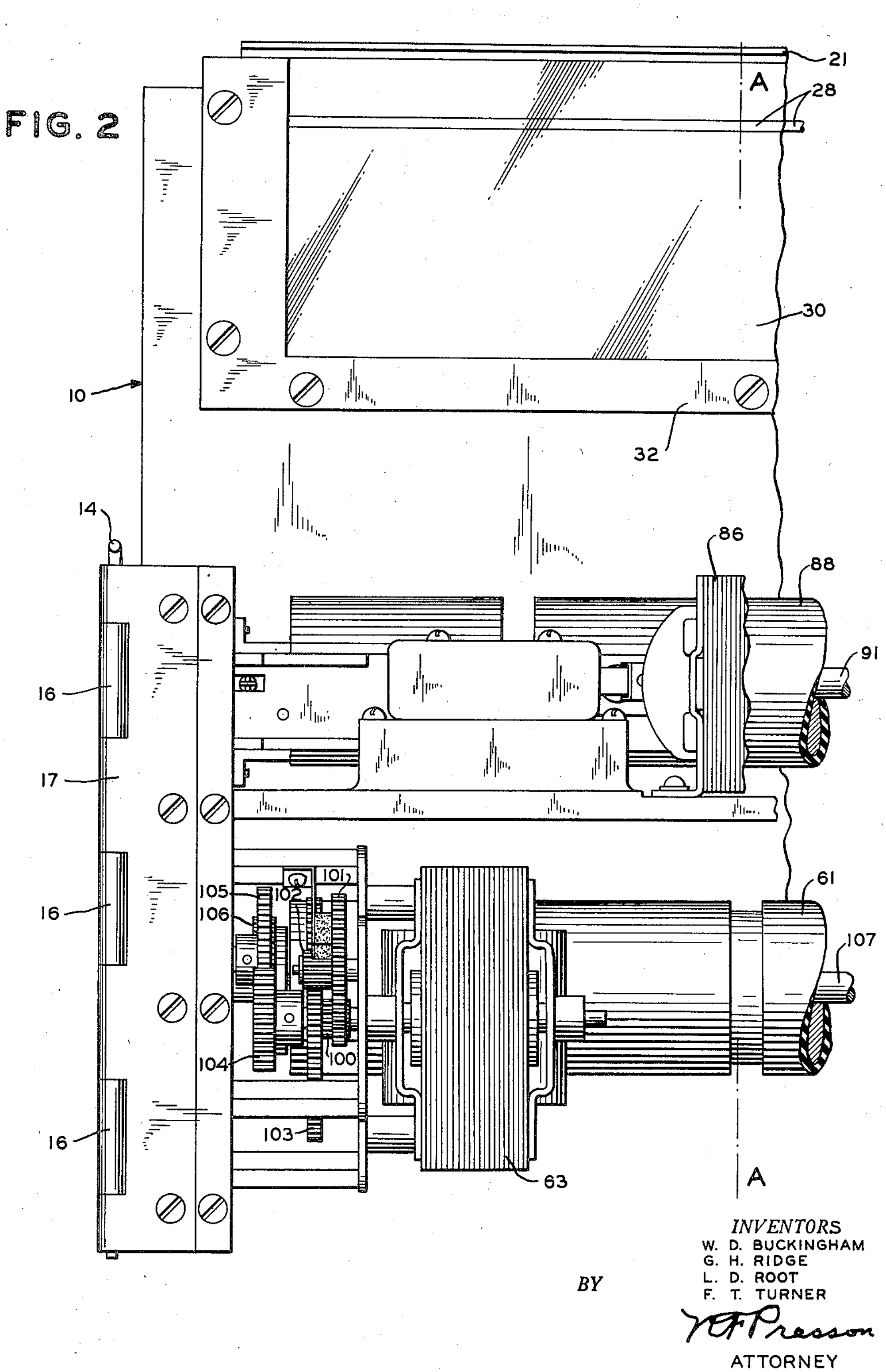
Figure 5:
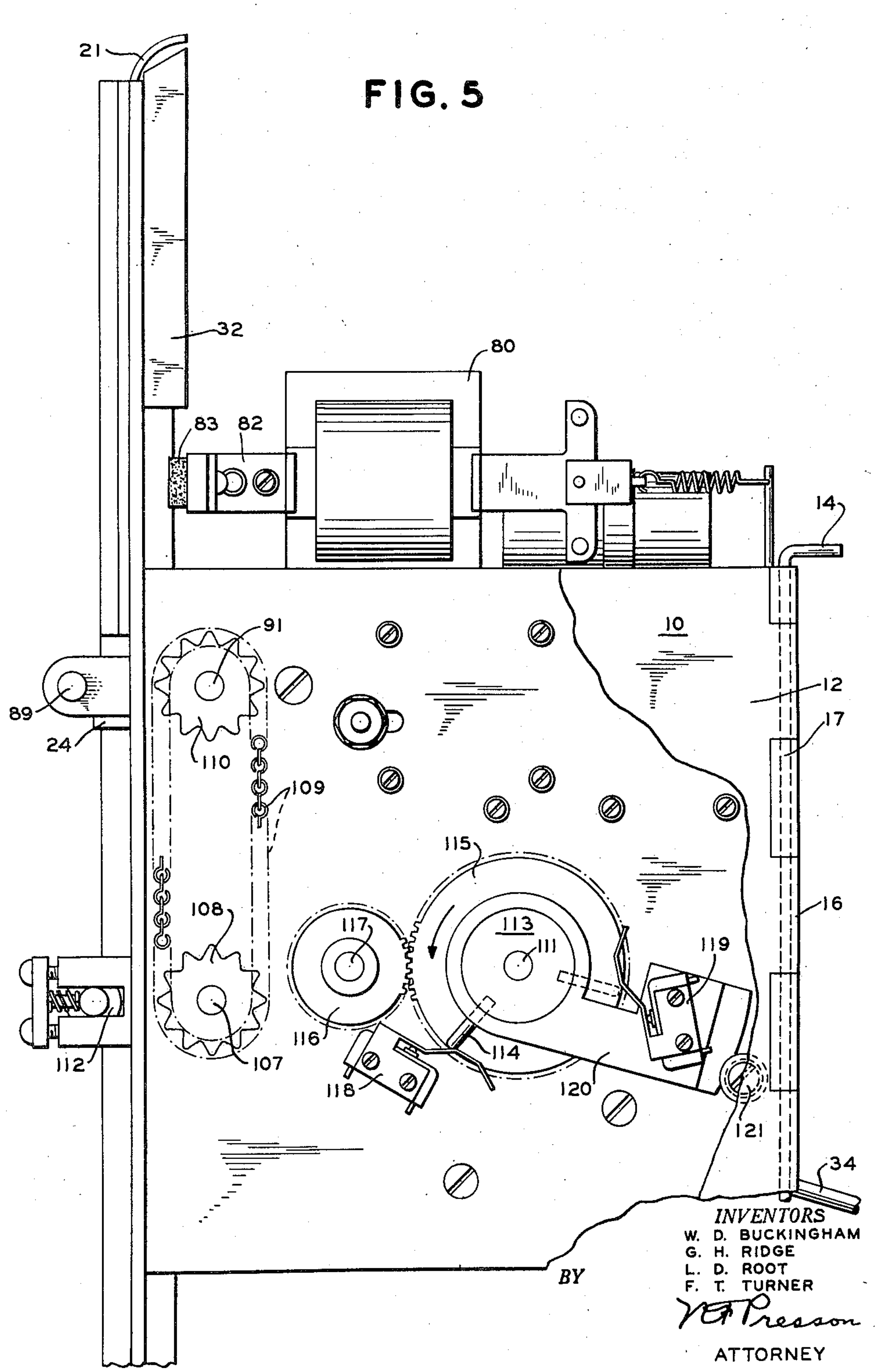
Fig. 5 is a left end view, in elevation, of the unit of Fig. 1.
Figure 8:
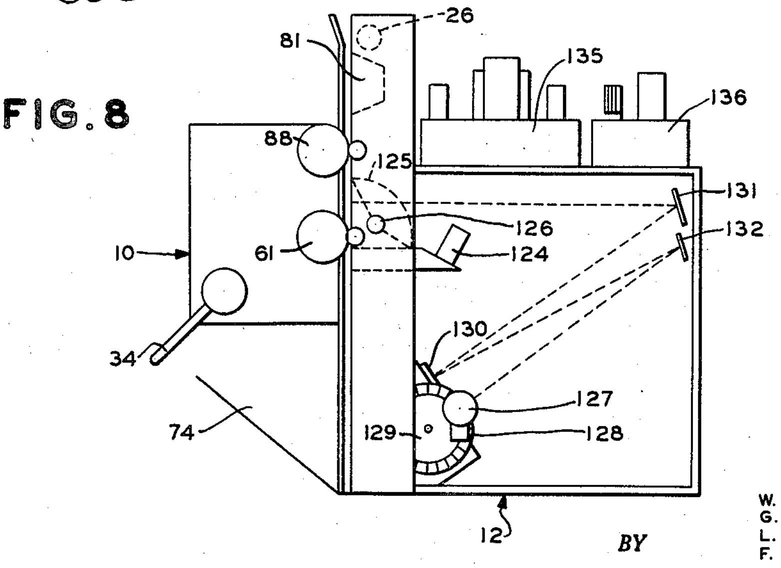
Fig. 8 is a diagrammatic view of a scanning light unit shown in operative relation with the paper feed unit.

Referring to the drawings, the message sheet feed unit, indicated at 10 in various of the figures, is hingedly mounted on the scanning light unit 12, Fig. 8, by a hinge pin 14, seen in Figs. 2 and 5, received within a hinge 16 secured to the frame of the message sheet feed unit 10. This mounting arrangement enables the feed unit to be swung outwardly for inspection, adjustment or other purpose, and if desired the pin 14 may readily be removed to enable the feed and scanning units to be dismantled from each other.

Figure 1:
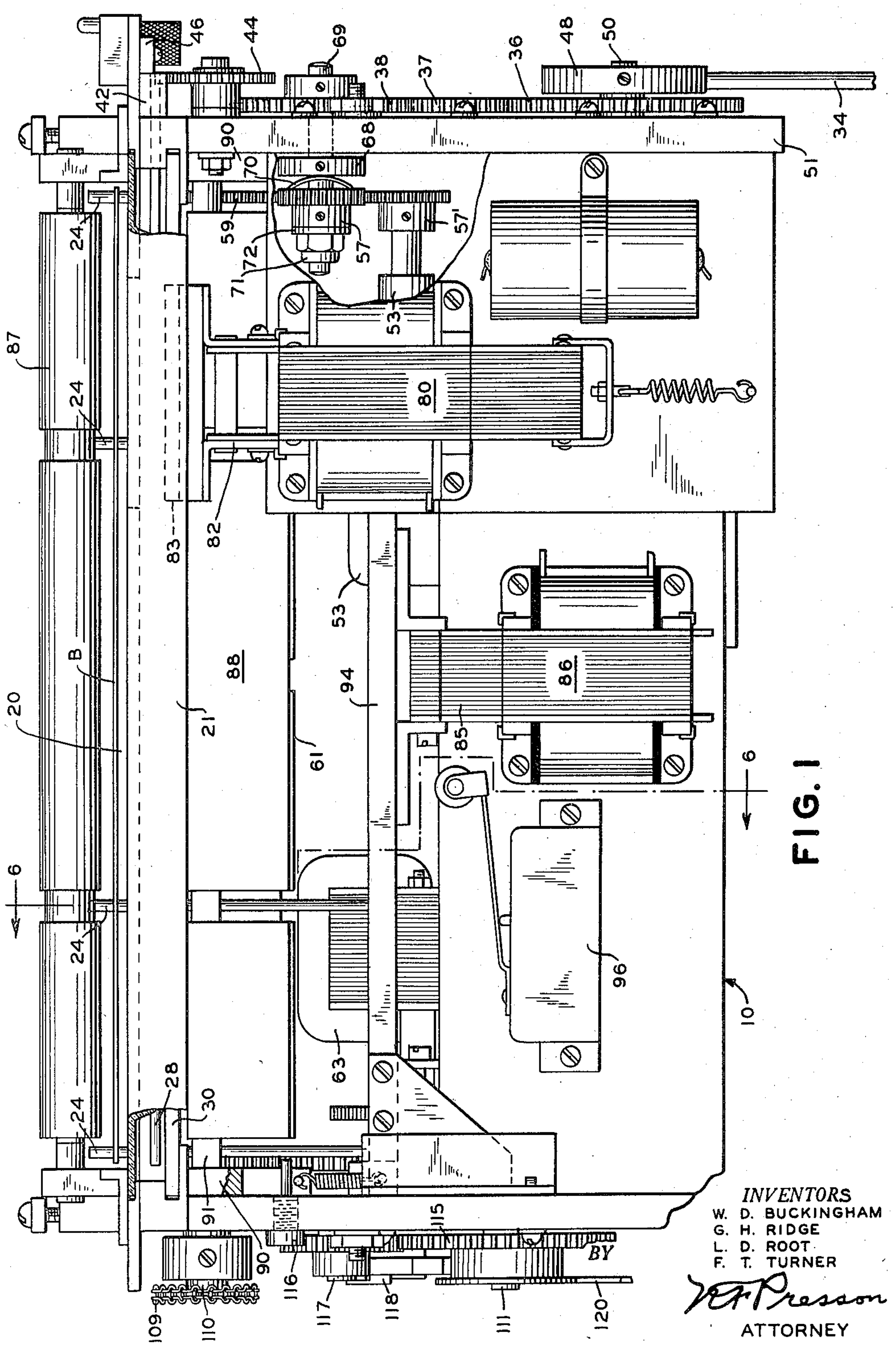
Figure 4:
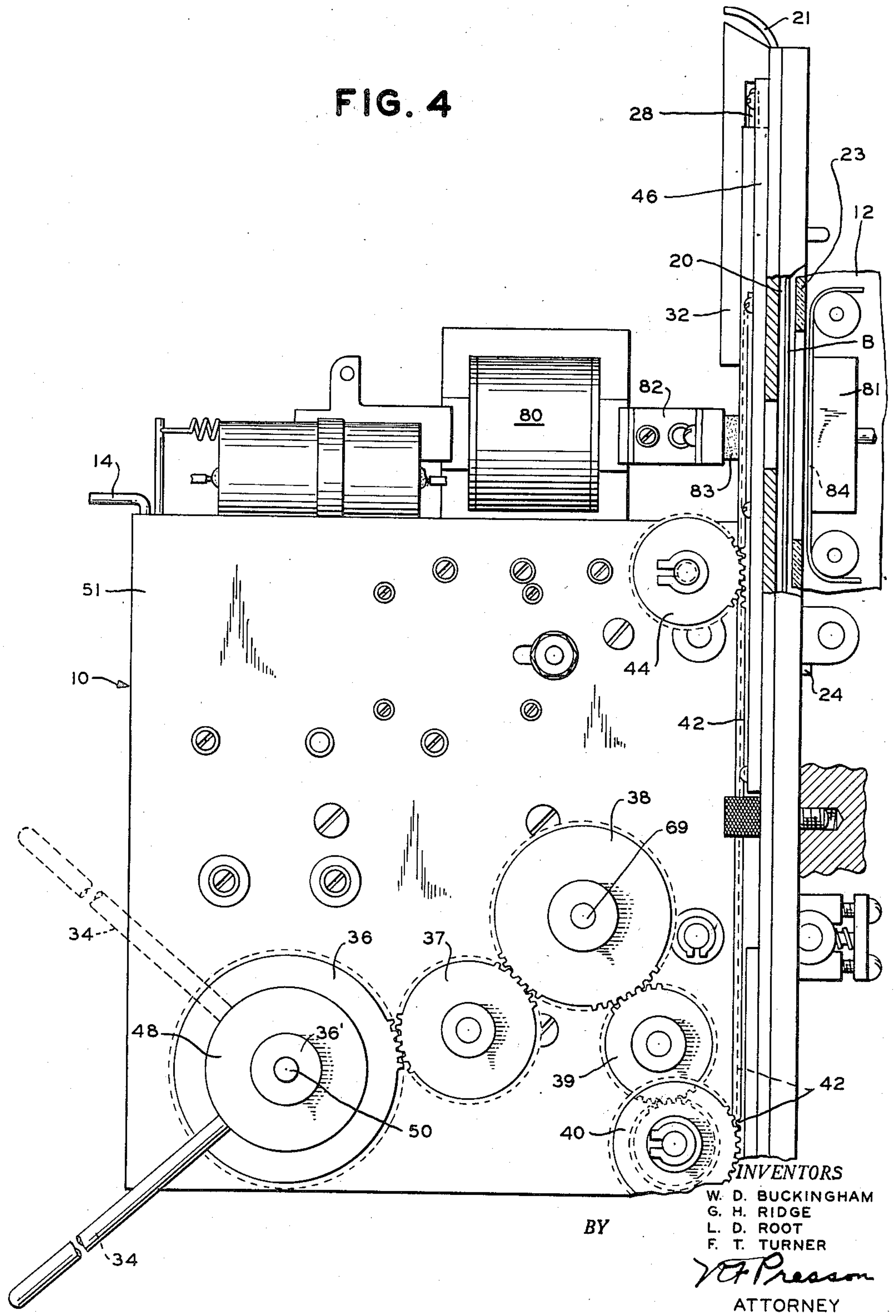
Fig. 4 shows a right end view, in elevation, of the unit of Fig. 1.
Figure 6:
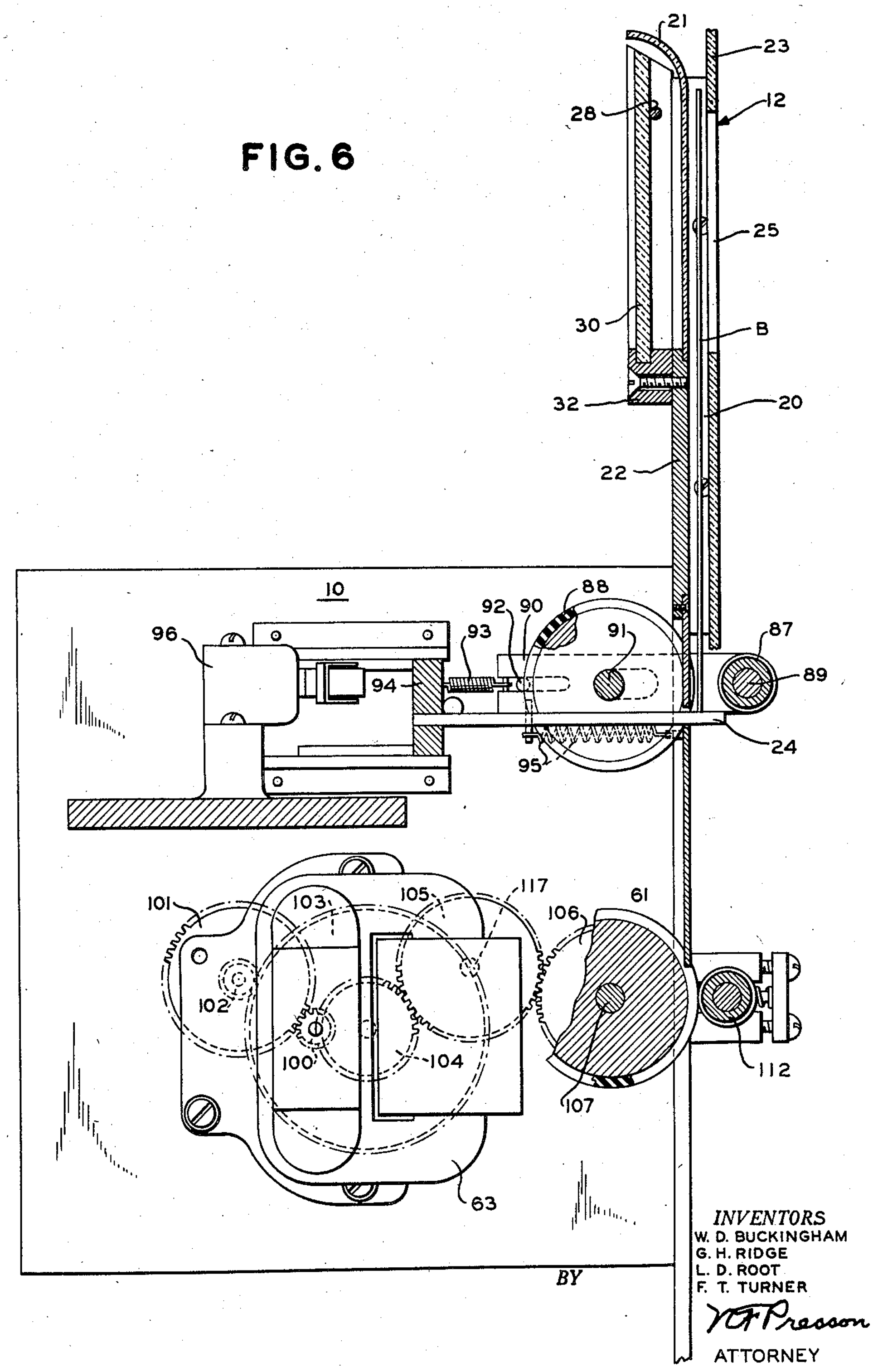
Fig. 6 is a sectional view taken along the line 6—6 of Fig. 1.

In order to send a telegram or other message, a message blank B is inserted in a message-receiving slot 20, Figs. 1, 4 and 6, the front wall of the slot being formed by a transparent plate 21 of Lucite or other suitable material secured to a wall 22 of the frame of the feed unit 10. The rear wall of the message slot is formed by a plate member 23 on the adjoining scanning light unit 12. The message blank is inserted in the slot 20 with its top edge downwardly and with the subject matter thereon facing the scanning light unit, and the blank drops downwardly in the slot until it is stopped and positioned by a series of retractile pins 24. A panel lamp 26, Fig. 8, within the scanning light unit transilluminates the message blank, through a translucent panel 25 in the wall 23, so that the subject matter on the message blank may be seen from the front through the Lucite plate 21 and a transparent plate 30. The latter plate, preferably Lucite, is mounted in a frame member 32 secured by screws to plate member 22.

A horizontally extending rod 28 comprises an end-of-message indicator, Figs. 1, 4 and 6, which is rigidly secured at one end to a rack 42, and extends horizontally behind the front plate 30. The indicator rod 28 is vertically movable relative to the message blank by means of a control handle 34 and a train of gears 36 to 40 and the rack 42, seen more clearly in Fig. 4. The rack is guided by an idler gear 44 and a guide strip 46. When the handle 34 is rotated by an attendant the horizontal rod 28 is moved either upwardly or downwardly, depending upon the direction of rotation of the handle, until the rod reaches a position just above the signature or end of the message or other subject matter on the inverted blank to be transmitted, which position may readily be observed due to the panel lamp 26. As seen in Fig. 4, the indicator rod approaches its uppermost position when the handle 34 is approaching its lowermost position, and vice versa.

Figure 3:
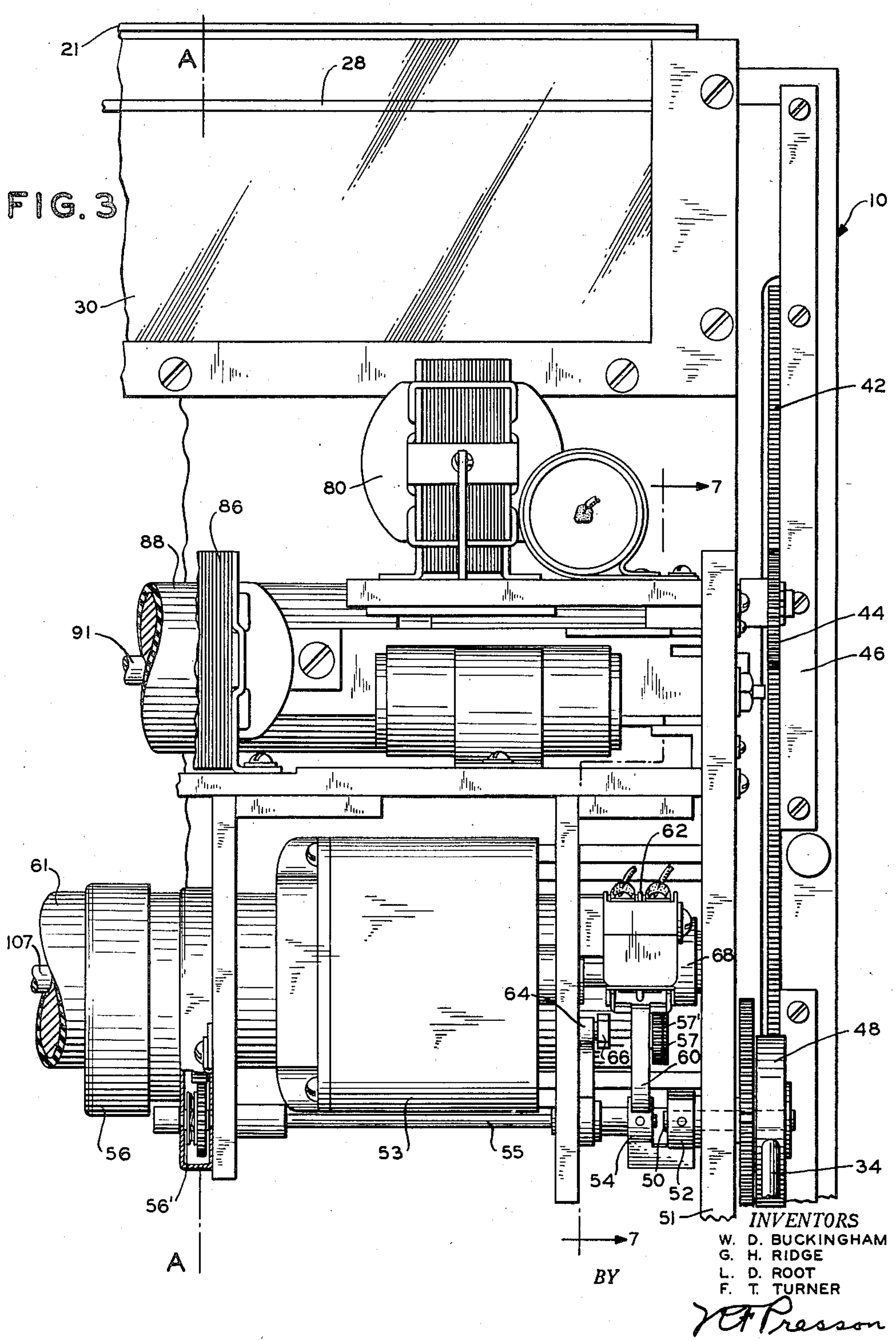
Figure 7:
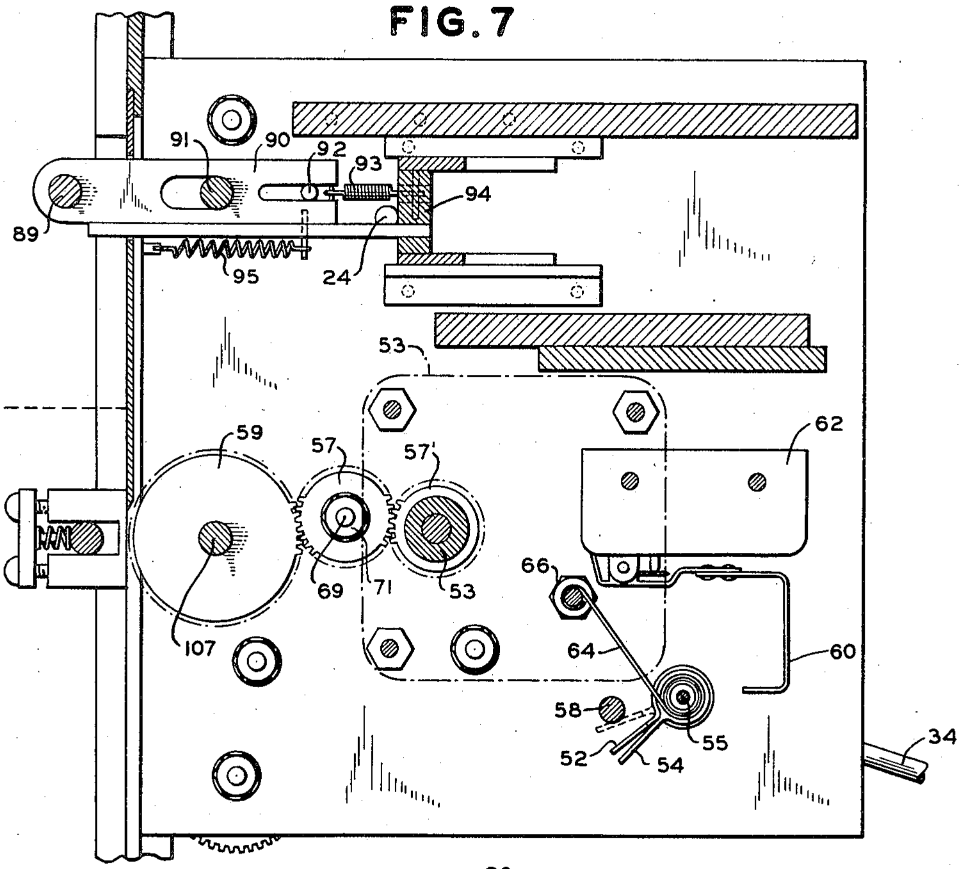
Fig. 7 is a sectional view taken along the line 7—7 of Fig. 3.

The end-of-message indicator setting handle 34 is screw-threaded or otherwise secured to a collar 48, Figs. 3 and 4. This collar is secured, as by a set screw, to a hub 36' of the gear 36, the gear being pinned to a stub shaft 50 rotatably mounted in a bearing in a plate member 51. On the inner end of the stub shaft is secured a back stop 52, Fig. 7, the effective position of which is determined by the position of the handle 34. A timer vane 54, Figs. 3 and 7, is secured, as by a set screw, to a shaft 55 which is driven by a synchronous timer motor 56 through the medium of a slip clutch 56' within the motor housing. Normally the vane 54 is urged into engagement with the back stop 52 by means of a torsion spring 64 secured between the shaft 55 and an anchor stud 66. The purpose of the above-mentioned slip clutch is to permit rotation of the vane 54 and hence shaft 55 independently of the timer motor 56 notwithstanding a large gear reduction in the timer motor. This enables a small inexpensive timer motor to operate synchronously at 3600 r.p.m. while the shaft 55 is reduced in speed by the motor gearing to ⅕ r.p.m.

The maximum length of the subject matter on the sheet that can be scanned is obtained when the back stop 52 has been rotated by the handle 34, in a clockwise direction as viewed in Fig. 7, until the stop is against a stub shaft in the manner shown in dotted outline. After the initial fast feed of the message blank has been completed by a fast feed motor 63, Fig. 1, in a manner hereinafter described, a slower speed synchronous motor 53 advances the message blank at the proper scanning speed, through gears 55, 57, 59, Fig. 4, and a feed roller 61, Fig. 3. The timer motor 56 is also energized and rotates the vane 54, Fig. 7, in a counterclockwise direction, at a speed commensurate with the scanning speed of motor 53, until the vane contacts a switch arm 60 of a micro-switch 62 and actuates the switch. While the vane 54 is thus rotating in a counterclockwise direction, Fig. 7, the backstop 52 is rotated in a clockwise direction by the motor 53 through a train of gears 57, 57', and gears 38, 37 and 36, Fig. 4, until the backstop is returned to its initial position against the stop member 58, Fig. 7. Intermediate the gears 57 and 53 is a friction drive comprising a disk 68 secured to a shaft 69, seen in Fig. 1, and a cupped spring washer 70 compressed between the gear 57 and the disk 68. The tension on the spring washer is adjustable by means of a stop nut 71 and washer 72. Since the indicator rod member 28 and the backstop 52 return at a faster linear rate than normal scanning speed, and reach their initial positions before scanning of the subject matter has been completed, the function of the friction drive is to permit continued paper feed by the motor 53, through gears 57, 57', 59, and the feed roller 61, after the initial positions of 28 and 52 have been reached. An important advantage of the foregoing arrangement is that if the attendant should forget to set the indicator prior to the initiation of transmission of a succeeding message the entire blank will be transmitted and thus eliminate the possibility of failing to transmit a portion of the subject matter on the blank.

The actuation of the switch 62 by the switch arm 60, Fig. 7, controls a relay circuit hereinafter described to remove the alternating current power from the timer motor 56 which comes to rest and terminates the slow feed operation. As soon as the timer motor is deenergized by the operation of switch 62, the torsion spring 64 returns the vane 54 to its initial position against the back stop 52 which, as previously stated, had been returned to a position against its stop member 58. In addition to deenergizing the timer motor 56, the operation of the end-of-message switch 62 and the relay circuit controlled thereby again energizes the fast feed motor 63 to rapidly feed out the message blank to a sent message bin indicated at 74 in Fig. 8.

*Operation of transmitting a message*

When a transmitting blank is dropped into the loading slot 20, Figs. 1, 6 and 7, with its top edge downwardly and the subject matter thereon facing the scanning beam unit, the blank is located at the proper starting position by a series of four retractile stop pins 24. The indicator rod 28, which is in its uppermost vertical position, is then moved downwardly by the handle 34 until the rod is just above the signature or end of the subject matter on the inverted message sheet, this position being readily noted by viewing the subject matter on the blank which is transilluminated by an incandescent light 26, Fig. 8.

Power for energizing the transmitter is turned on, and when a start signal is received from the recorder connected to the transmitter, a solenoid 80, Figs. 1 and 4, associated with a well-known type of time stamp 81, is energized and its plunger 82 causes a platen 83 to strike the back of the message blank B and press it against an inking ribbon 84 to cause the type wheel faces in the time stamp to stamp the face of the blank with the year, month, day, hour and minute and also an identifying symbol which designates the particular transmitter involved. Concurrently with the energization of the solenoid 80 a second solenoid 86, Fig. 1, is energized and causes a pressure feed roller 87 to be moved inwardly to cause the message blank to be gripped between the roller 87 and a driven feed roller 88, the blank preferably being gripped an instant before the time stamp is applied. The pressure feed roller is mounted on a shaft 89 which is carried by two slidable members 90, seen in Figs. 6 and 7. The members 90 are slotted to ride on, and be guided by, the shaft 91 of roller 88 and guide pins 92. These slide members are coupled by coil springs 93 to a cross bar 94 of the roller frame structure, and the bar is secured to the plunger 85 of the solenoid 86 seen in Fig. 1. The bar 94 carries the retractile blank-positioning pins 24, as seen in Figs. 6 and 7, and in its movement operates a roller frame switch 96 to open the circuit of the time stamp solenoid 80 and insure that only one clear sharp pulse reaches the time stamp solenoid to cause impact of the platen 83 on the portion of the blank over the type faces.

The movement of the solenoid plunger 85, Fig. 1, continues after the pressure feed roller 87 has engaged the message blank to retract the positioning pins 24 and pull them out of the message slot 20 and clear the slot so that the blank may be advanced through the transmitter. The solenoid 86 remains energized to keep the feed rolls 87 and 88 in gripping position and to hold the pins 24 retracted until the blank has cleared the machine; upon deenergization of the solenoid at the termination of the feeding operation, the pressure feed roller 87 and the pins 24 are returned under the influence of the spring 93, Figs. 6 and 7, and a tension spring 95, to their original positions.

*Initial fast feed of blank.*—Upon retraction of the pins 24, the fast feed motor 63 seen in Fig. 6 is energized and drives the lower feed roller 61 through a train of gears 100 to 106 and the shaft 107 of the roller 61. Mounted on one end of the shaft 107 is a sprocket 108, Fig. 5, which drives the upper feed roller 88, Fig. 6, through a chain 109 and a sprocket 110 mounted on the shaft 91 of the upper feed roller. This drive connection insures that feed rollers 88 and 61 are always rotated at the same speed, but the outside diameter of the lower feed roller is slightly larger than the diameter of the upper feed roller to cause the message blank to remain taut during a scanning operation. Mounted within each end of the feed roller 61 is an overrunning clutch (not seen) so that when the fast feed motor is energized the lower scanning speed motor is in effect disconnected from the roller, and conversely when the scanning speed motor is energized the fast feed motor is in effect disconnected from the roller 61. A spring-loaded pressure roller is associated with the roller 61.

The duration of the initial fast feed period is determined by a pin member 114 mounted in the hub or metering cam 113 on a gear 115 secured to a shaft 111, Fig. 5, which gear is driven by a gear 116 fixedly mounted on a shaft 117. The shaft 117 is driven by the fast feed motor 63, Fig. 6, through the gears 104 and 105. Rotation of the fast feed motor causes the pin member 114 to rotate, in the direction of the curved arrow seen in Fig. 5, at a predetermined ratio, with respect to the feed rollers 61 and 88. In idle condition of the transmitter the pin 114 is in a position to maintain a microswitch 118 in its open-circuit position. During fast feed operation the pin 114 is rotated until it reaches the dotted line position shown, at which time it operates a microswitch 119 to a position which opens the energizing circuit of the fast feed motor, and also stops further rotation of the pin 114 which remains in this position. At this time the blank has been advanced until the first line of the message to be transmitted appears at the scanning line position. The operation of the microswitch 119 closes a circuit for energizing the slower scanning speed motor 53 which drives the feed rollers 61 and 88 at a proper scanning speed. The switch 119 is mounted on plate member 120 which is arcuately adjustable about the shaft 111 and is held in its adjusted position by a set screw 121, whereby the switch 119 may be adjusted to different positions to vary the length of the arcuate path of travel of the cam or pin 114 between the switches 118 and 119 to enable fast feed of message blank headings of different lengths.

Scanning of the message blank may be effected in various known ways, but preferably the scanning system is in accordance with the disclosure of the aforesaid Buckingham et al. application. Referring to Fig. 8, scanning is accomplished by sweeping a tiny spot of light horizontally across the message blank in one direction at a uniform speed and returning the spot quickly, for example, at 19 times the forward speed, to the other margin of the message blank repeat the cycle again and again as the message is advanced downwardly at a uniform speed past the scanning line by the feed rollers 61 and 88. Light reflected from the message is collected by a cylindrical reflector 125, concentrated on a photocell 126, and converted into electrical currents whose intensities are proportional to the reflected light at each instant.

Preferably, although not necessarily, the light source used is a miniature tungsten arc lamp 127, whose electrodes are a tungsten ball cathode ten-thousandths of an inch in diameter supported on the end of a four-thousandths of an inch diameter tungsten wire, and a small molybdenum disk anode. These two elements are mounted in a small glass bulb filled with an inert gas such as argon. During operation the tungsten ball is maintained at incandescence by the heat of the arc to produce an extremely small, uniformly bright, stable and well defined spot of light. It can be focused directly on the message in the transmitter without the use of the condensing lenses and pinpoint aperture such as are required to produce an effective point source from the ordinary tungsten filament lamp commonly employed in facsimile scanners. The light output of the tungsten ball lamp is relatively constant.

Light from the tungsten arc lamp is interrupted by a conventional chopper disk 128 driven by a scanning motor 129 and the scanning light is collected by a concave spherical mirror 130 which then reflects the image of the incandescent tungsten ball as a small bright spot of light on the face of the message. This mirror comprises a simple lens, similar to those used in eyeglasses, whose concave spherical surface has been coated with aluminum to form a concave mirror. Flat mirrors including mirrors 131 and 132 are interposed in the optical path between the lamp and the concave mirror and between the concave mirror and the message to direct the light beam back and forth so as to reduce the overall space required for the optical path. The concave mirror is mounted on a support which is rocked by a cam driven by the motor 129, and this motion causes the image to sweep across the message at uniform speed during 95% of the time of one revolution of the cam and to return to the starting point in the remaining 5% of the time. The rocking mirror may be operated at speeds up to at least 30 times a second or 1800 r.p.m. Various of the control relays for the feeding and scanning units are designated at 135, and the lamp power supply apparatus is indicated at 136. During the scanning operation the message is advanced downwardly across the scanning line at a speed which produces 100 scanning lines to the inch of the message blank. As the spot scans across the sheet, the light which is reflected from the message is collected by the cylindrical reflector 125 and brought to a focus as a line of light on the cathode of the photocell 126. A preamplifier 124 is in circuit with the photocell. The latter preferably is of a type which has a long narrow light-sensitive surface so as to pick up as much as possible of the line of light generated by the cylindrical reflector. With this combination of cylindrical reflector and photocell, the whole length of the photo cathode collects light at all times regardless of the position of the spot of light along the scanning line, and thus avoids the usual requirement that the photo cathode must be equally sensitive at all points. The cylindrical mirror collects the reflected light over an average solid angle of more than 90°. If the reflected light is assumed to have a Lambert cosine spatial distribution, it can be shown that the cylindrical reflector collects more than 50% of the total reflected light.

At the end of the scanning operation, as determined by the actuation of the end-of-message switch 62 shown in Fig. 7, the fast feed motor 63 is again energized and causes fast feed-out of the message blank into the "sent message" bin. During this fast feed the pin 114, Fig. 5, is rotated, in the direction of the curved arrow, from the dotted line position to its initial position, shown in full line, whereat it actuates the switch 118 to open the energizing circuit of the fast feed motor 63 and the motor comes to rest. The panel lamp 26 is now caused to light, by operation of the associated control circuits, thereby indicating that the transmitter is available for the transmission of another message.

Figure 9:
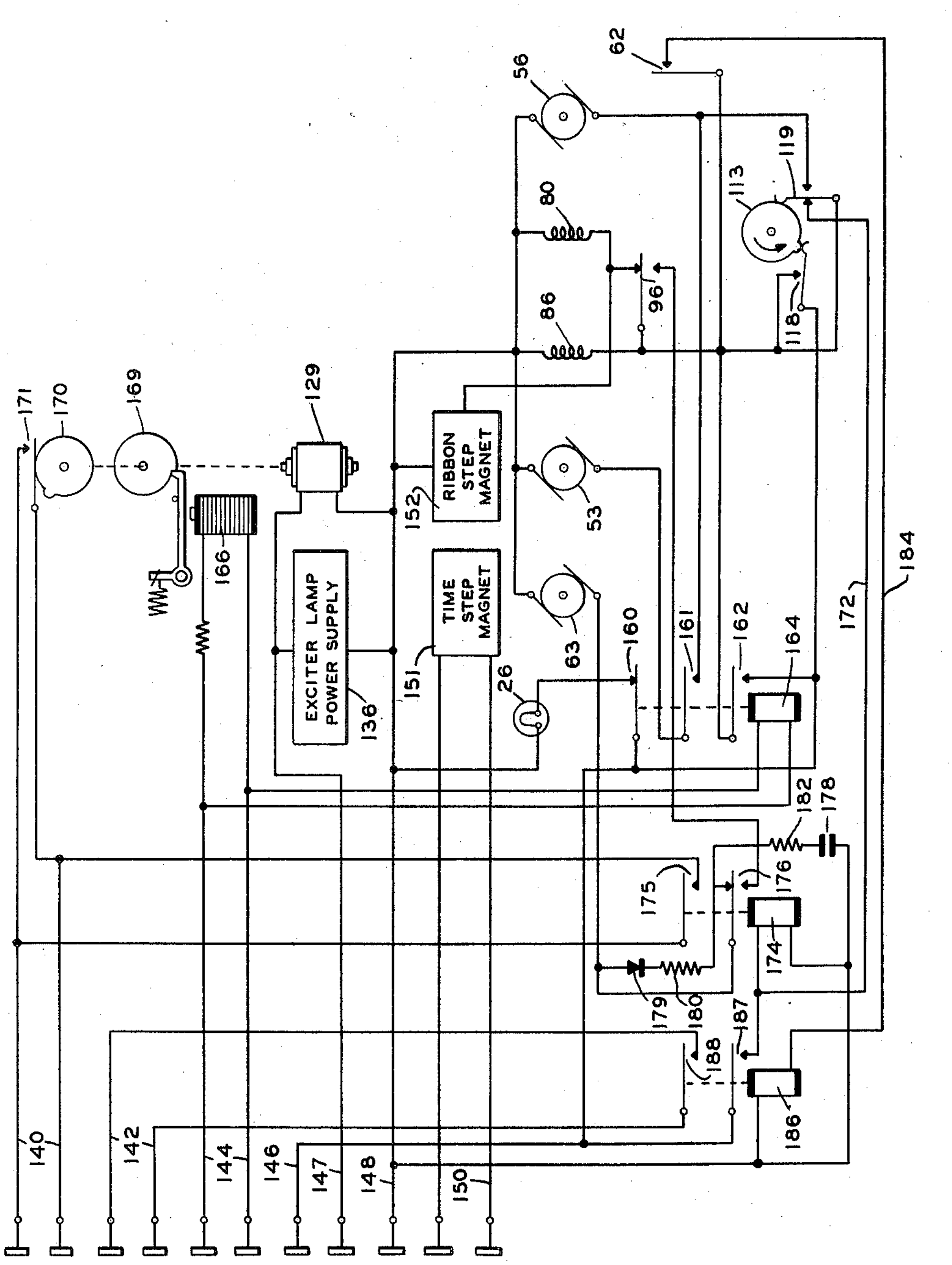
Fig. 9 is a schematic wiring diagram of certain control circuits employed.

*Control circuit.*—Figure 9 is a schematic wiring diagram of illustrative control circuits that may be employed with the transmitter. All relays and switches are shown in their normal positions prior to a transmitting operation. The vertical row of small rectangles at the left of the diagram indicates detachable connectors, preferably of the plug and jack type, whereby the conductors of the control circuit may readily be connected to or disconnected from the associated facsimile line equipment. The pair of conductors 140 is for connection to the facsimile transmission line. The two conductors 142 are in a circuit which transmits an end-of-message signal to the connected recorder either directly over the transmission line, as by a simplex circuit, or indirectly to relays in the facsimile line equipment or in concentrator equipment, in known manner. Conductor 146 is for connection to one side of a 110 volt alternating current source of power; conductor 147 is for connection to the same side of the A.C. source of power supply as conductor 146, but through a manually operable switch or a relay contact in the facsimile line equipment; and conductor 148 connects to the other side of the A.C. power supply. The pair of conductors 150 is for connection to a master clock circuit for actuating the stepping magnet 151 of the time stamp.

When the power is turned on the panel lamp 26 is energized over a circuit comprising A.C. power conductor 146, armature and break contact 160 of a relay 164, the lamp 26, and A.C. conductor 148. When a message is inserted in the message-receiving slot in the manner hereinbefore described, the attendant adjusts the end-of-message control to set the indicator rod just beyond the last line of intelligence to be transmitted. Circuits in the associated facsimile line equipment, comprising either manually operable switches or concentrator arrangements, establish connection to a desired recorder in known manner and apply A.C. power to the tungsten arc lamp supply and the scanning motor 129. At the same time a sequence of events is initiated whereby at conclusion thereof a start signal derived from a phasing commutator of the connected recorder is received by the transmitter, and is applied over conductors 144 to the clutch release magnet 166 of the scanning motor 129 and releases the clutch cam 169 and allows the latter to rotate in phase with the recorder. A blanking cam 170 also rotates and closes blanking contacts 171 to short out the transmission line during the time that the scanning light beam is returning to its starting point after it has swept across the message each time during transmission of the facsimile intelligence signals.

The start signal received over conductors 144 also operates the relay 164 which at its armature and contact 160 opens the circuit of the panel lamp 26 during the transmission of each message since relay 164, and also the release magnet 166 are kept energized by direct current over the circuit 144 during the transmission period. At all other times the lamp 26 remains lit to indicate the availability of the transmitter for the insertion of a message blank. The operation of relay 164, at its armature and make contact 162, applies A.C. power from conductor 146 to the solenoid 86 and also through the upper normally closed contacts of the roller frame switch 96 to the time stamp solenoid 80 and the associated ribbon step magnet 152; conductor 148 is the common return side of the A.C. power supply. The power supply from the contacts 162 of relay 164 is also supplied, through the normally closed left hand contact and tongue of micro-switch 119 and conductor 172, to the coil of relay 174 and thence to the common return 148, and relay 174 operates.

The operation of the plunger of the solenoid 86 retracts the retractile pins in the message slot and causes the pressure feed roller to press the message blank firmly against the driven feed roller. The operation of the time stamp solenoid 80 causes the time stamp platen pad to press the message blank firmly against the type wheels of the time stamp, causing an impression thereof to be made on the message blank. The operation of the ribbon step magnet 152 advances an inked ribbon to present a fresh surface thereof for each impression.

At or near the end of the travel of the roller frame structure hereinbefore described, the roller frame switch 96 is operated so that its switch blade is moved from its upper contact to its lower contact. This opens the circuit formerly through the upper contact and removes the A.C. power from the time stamp solenoid 80 and ribbon step magnet 152, allowing them to return to their normal positions. The closure of the roller frame switch blade with its lower contact applies A.C. power to the lower contact and tongue 176 of the operated relay 174, thereby applying power to the fast feed motor 63 and at the same time charges a brake capacitor 178 through a rectifier 179 and resistances 180, 182. The closure of contacts 175 of relay 174 also places a short circuit across the outgoing signal line 140 and its associated line equipment, preventing facsimile pickup signals from being transmitted to the connected recorder during the period of fast feed of the message blank.

The roller frame switch 96 performs two functions, (1) to apply power to the time stamp solenoid 80 for a definite and short period of time (travel time of the roller frame) thereby insuring a clean impression of the type, and (2) to delay the application of power to the fast feed motor 63 until the message blank has been pressed against the feed roller, thereby insuring that an accurate predetermined length of the blank will be fed in at the fast-feed rate.

The operation of the fast feed motor rotates the fast-feed metering cam 113; at the start of rotation of the cam, switch contacts 118 are closed and perform a circuit holding function hereinafter described. When a predetermined length of message blank has been fed in, as determined by the position of switch 119 with respect to switch 118, the cam operates switch 119 and the switch blade leaves its left hand, or break, contact thereby opening the energizing circuit of relay 174 which restores. When the switch engages its right hand, or make, contact, this applies A.C. power to the timer motor 56, and also through contacts 161 of relay 164 to the slow feed motor 53.

The release of relay 174, at its armature 176 and lower contact, removed power from the fast feed motor 63 and connected the motor, through the armature 176 and its upper contact, to the brake capacitor 178 which was previously charged by the rectifier 179. The capacitor discharges through the field winding of the fast feed motor, the resulting surge of direct current causing the kinetic energy of the motor armature to be rapidly dissipated and bringing the motor armature and associated gears rapidly to a smooth stop, thereby insuring the accuracy of measurement of the length of the blank fed in at the fast rate. The release of relay 174, at its armature 175 and make contact, also removed the short circuit from the outgoing facsimile signal line 140 so that signals may be transmitted during the slow feed operation.

At the end of a period determined by the end-of-message indicator, the end-of-message switch 62 is operated and applies A.C. power over conductor 184 to a relay 186 which operates. Relay 186, at its contacts 187, energizes relay 174, and at its contacts 188 closes the circuit of conductors 142 of the associated facsimile line equipment which initiates a sequence that removes current from the clutch magnet 166 and from the winding of relay 164 which restores. The operation of relay 174 again short circuits the signal line 140, and applies power to the fast feed motor 63 and charges the brake capacitor 178 as before. The release of relay 164, at its contacts 160 causes the panel light 26 to light and indicate the availability of the transmitter for receiving another message blank, and at its contacts 161 removes power from the slow feed motor 53, but the timer motor 56, the roller solenoid 86, the fast feed motor 63 and relay 174 remain energized through the holding circuit established by the prior closure of contacts 118 of the metering cam 113. The metering cam again rotates and releases its switch blade 119 which leaves its right hand contact and returns to its left hand contact; this removes power from the timer motor 56 and closes a circuit to the winding of relay 174 in parallel with the contacts 187 of relay 186. The removal of power from the timer motor 56 allows the timer vane hereinbefore described to return to the start position and thereby releases the end-of-message switch 62 which removes power from the winding of relay 186.

Relay 174 remains energized over conductor 172 until the timer cam 113 again opens contacts 118 thereof. The opening of contacts 118 removes power from the roller solenoid 86, the fast feed motor 63 and the relay 174. The release of the latter relay brakes the fast feed motor as previously explained, leaving the metering cam 113 at rest with its contacts 118 in open-circuit position, and the circuits are restored to the idle condition.

The embodiment disclosed herein is for the purpose of illustrating the principles of the invention and one mode of application thereof, and various changes and modifications may be made without departing from the spirit of the invention which is not to be regarded as limited except as indicated by the scope of the appended claims.

What is claimed is:

1. In a facsimile transmitter in which the subject matter on a message blank is scanned by a scanning light beam that repeatedly travels transversely across the blank in a predetermined linear scanning path as the blank is advanced, structure forming a message receiving slot into which a message blank may be inserted, sheet-positioning members extending into the slot for engaging the leading edge of the inserted message blank to locate it in proper starting posiiton, sheet feeding mechanism including an electromagnet and reciprocable structure actuatable thereby, a feed roller controlled by said reciprocable structure, means for applying a start signal to said electromagnet to cause the reciprocable structure to actuate the feed roller into engagement with said blank for advancing the blank through the transmitter for a scanning operation, and means controlled by said reciprocable structure for retracting said sheet-positioning members from the message receiving slot to permit the advancement of the blank.

2. Apparatus according to claim 1, including means for actuating said reciprocable structure in a direction to cause the feed roller to move out of engagement with the message blank when said electromagnet is deenergized.

3. Apparatus according to claim 1, in which the sheet-positioning members are actuated by the reciprocable structure, under control of said electromagnet, into and out of the message receiving slot as the feed roller is actuated out of and into engagement, respectively, with the message blank.

4. In a facsimile transmitter in which the subject matter on a message blank is scanned by a scanning light beam that repeatedly travels transversely across the blank in a predetermined linear scanning path as the blank is advanced, structure forming a message receiving slot into which a message blank may be inserted, sheet feeding mechanism operative in response to a start signal and including a feed roller actuable into engagement with said blank for advancing the blank through the transmitter for a scanning operation, a time stamp device for printing the instant clock time on a predetermined portion of the inserted blank, a reciprocable platen for striking the blank against the stamp device to effect printing of the time and means including a printing solenoid controlled by said start signal for actuating said platen to effect the printing operation substantially at the time that said feed roller is actuated into engagement with the blank.

5. Apparatus according to claim 4, in which the operations of said feed roller and platen are timed to cause the roller to be actuated into engagement with the blank an instant before the platen strikes the blank against the time stamp to effect the printing operation.

6. Apparatus according to claim 4, including switch means controlled in accordance with the movement of the platen for opening the energizing circuit of said printing solenoid when the platen has struck the blank against the time stamp device to insure that only one clear sharp pulse reaches the solenoid to cause impact of the platen on the blank.

7. In a facsimile transmitter in which the subject matter on a message blank is scanned by a scanning light beam that repeatedly travels transversely across the blank in a predetermined linear scanning path as the blank is advanced, structure forming a message receiving slot into which a message blank may be inserted, sheet-positioning members extending into the slot for engaging the leading edge of the inserted message blank to locate it in proper starting position, sheet feeding means operative in response to a start signal and including a feed roller actuatable into engagement with said blank for advancing the blank through the transmitter for a scanning operation, means including reciprocable structure for retracting said sheet-positioning members from the message receiving slot to enable advancement of the blank, a time stamp device for printing the instant clock time on a predetermined portion of the blank when in said starting position, a reciprocable platen for striking the blank against the stamp device to effect printing of the indicia, a printing solenoid controlled by said start signal for actuating the platen to effect the printing operation, and switch means operable by said first named reciprocable structure during retraction of the sheet-positioning members for opening the energizing circuit of said printing solenoid.

8. In a facsimile transmitter in which the subject matter on a message blank is scanned by a scanning light beam that repeatedly travels transversely across the blank in a predetermined linear scanning path as the blank is advanced, structure having front and rear walls spaced from each other a distance to form a receiving slot into which a message blank may be inserted with the subject matter thereon facing the rear wall and subject to scanning as the blank is advanced past the scanning line position, means for locating the leading edge of the blank in proper starting position in the slot, an end-of-message indicator member manually movable along one wall of the message receiving slot structure and settable to a position to indicate the end of the message on the blank, means controlled in accordance with the setting of the indicator member to terminate transmission of facsimile signals from the blank, said one wall of the slot structure comprising transparent material, and a light source positioned to transilluminate the blank and enable the end of the message thereon to be seen through said wall and the end-of-message indicator member to be set accordingly.

9. Apparatus according to claim 8, in which the indicator member is movable in front of said front wall of the receiving slot structure, and both said front and rear walls thereof comprise transparent material, said light source being located behind said rear wall for transilluminating the blank.

10. Apparatus according to claim 8, including sheet feeding mechanism for advancing a message blank through the transmitter for a scanning operation, and means automatically operative for extinguishing said light source while the blank is being advanced and for energizing the light source when the scanning operation has been completed to give a visual indication of either the busy or idle condition of the transmitter.

11. Apparatus according to claim 8, and including a transparent plate positioned in front of and spaced from said movable indicator member.

12. In a facsimile transmitter in which the subject matter on a message blank is scanned by a scanning light beam that repeatedly travels transversely across the blank in a predetermined linear scanning path as the blank is advanced, structure extending upwardly and having front and rear walls spaced from each other a distance to form a receiving slot into which a message blank may be dropped with the heading thereon downwardly and the subject matter thereon facing the rear wall and subject to scanning as the blank is advanced past the scanning line position, means for locating the leading edge of the blank in proper starting position in the slot, an end-of-message indicator rod extending transversely across, and movable upwardly or downwardly along, one wall of the message receiving slot structure, manually operable means for setting said rod to a position that indicates the end of the message on the blank, means controlled in accordance with the setting of the indicator rod to terminate transmission of facsimile signals from the blank, said one wall of the slot structure comprising transparent material, and a light source positioned to transilluminate the blank and enable the end of the message thereon to be seen through said wall and the end-of-message indicator rod to be set accordingly.

13. In a facsimile transmitter in which the subject matter on a message blank is scanned by a scanning light beam that repeatedly travels transversely across the blank in a predetermined linear scanning path as the blank is advanced for generating and transmitting facsimile intelligence signals, and having sheet feeding means for advancing the blank at a predetermined scanning speed and means for effecting fast feed of the blank; an end-of-message indicator device having an initial setting and means for causing scanning of a message blank to continue from the beginning of the message thereon until substantially the remainder of the blank has passed said linear scanning path, manually operable means for moving the indicator device to another setting representing the end of the message on the blank, a timer member and actuating means for automatically setting the timer member to a starting position corresponding to the instant setting of said indicator device, drive means for continuously moving the timer member from its starting position at a rate having a definite ratio to the rate of advancement of the message past the scanning path, means including an end-of-message switch operated by the timer member as soon as scanning of the message has been completed for causing fast feed-out of the blank, drive means for returning the end-of-message indicator device to its initial setting during the scanning operation, and drive means for returning the timer member promptly to a position corresponding to the initial setting of said indicator device.

14. Apparatus according to claim 13, including means for initially effecting fast feed of the message blank until the subject matter thereon substantially reaches said scanning path, and means for preventing the transmission of facsimile intelligence signals during both the initial fast feed operation and said fast feed-out of the blank.

15. In a facsimile transmitter in which the subject matter on a message blank is scanned by a scanning light beam that repeatedly travels transversely across the blank in a predetermined linear scanning path as the blank is advanced, and having sheet feeding means for advancing the blank at a predetermined scanning speed and means for effecting fast feed of the blank; an end-of-message indicator device and a settable member each having an initial setting for causing scanning of a message blank to continue from the beginning of the message thereon until substantially the remainder of the blank has passed said linear scanning path, manually operable means for moving the indicator device and settable member each to another setting representing the end of the message on the blank, a timer member and biasing means normally urging the timer member against said settable member to establish a starting position for the timer member, means for continuously moving the timer member from its starting position at a rate having a definite ratio to the rate of advancement of the message past the scanning path, means including an end-of-message switch operated by the timer member as soon as scanning of the message has been completed for preventing further movement of the timer member and for causing fast feed-out of the blank, drive means for returning the end-of-message indicator device and said settable member to their initial settings during the scanning operation, said biasing means acting to return the timer member promptly to a position against said settable member.

16. In a facsimile transmitter in which the subject matter on a message blank is scanned by a scanning light beam that repeatedly travels transversely across the blank in a predetermined linear scanning path as the blank is advanced, and having sheet feeding means for advancing the blank at a predetermined scanning speed and means for effecting fast feed of the blank; an end-of-message indicator device and a settable member each having an initial setting for causing scanning of a message blank to continue from the beginning of the message thereon until substantially the remainder of the blank has passed said linear scanning path, manually operable means for moving the indicator device and settable member each to another setting representing the end of the message on the blank, a timer member and a spring normally urging the timer member against said settable member to establish a starting position for the timer member, a timer motor for continuously driving the timer member from its starting position at a rate having a definite ratio to the rate of advancement of the message past the scanning path, means including an end-of-message switch operated by the timer member as soon as scanning of the message has been completed for preventing further movement of the timer member by said timer motor and for causing fast feed-out of the blank, drive means for returning the end-of-message indicator device and said settable member to their initial settings during the scanning operation, said spring acting to return the timer member promptly to a position against said settable member.

17. Apparatus according to claim 16, in which said timer member is rotatably mounted, and including a driving clutch between the timer motor and the timer member rotated thereby, said clutch enabling the timer member to be returned by said spring to a position against said settable member without rotating the timer motor.

18. Apparatus according to claim 17, in which a torsion spring normally urges the timer member against said settable member, said spring being tensioned during the rotation of the timer member by the timer motor and acting to return the timer member promptly to a position against said settable member.

19. A facsimile transmitter comprising, in combination, structure forming a receiving slot into which a message blank may be inserted, means for causing a scanning light beam to repeatedly travel transversely across the blank in a predetermined linear scanning path for scanning the message on the blank, means controlled by a start signal for feeding the blank through the transmitter at a fast rate until a predetermined portion of the blank approaches said linear scanning path, a stamp device and means controlled by said start signal for causing said device to print indicia on the blank prior to the aforesaid feeding operation, means for feeding the blank at a slower rate while the message is being scanned, and means for again feeding the blank at a fast rate when scanning of the message has been completed.

References Cited in the file of this patent

UNITED STATES PATENTS

| | | |
|---|---|---|
| 1,370,669 | Potts | Mar. 8, 1921 |
| 2,262,715 | Wise | Nov. 11, 1941 |
| 2,287,413 | Bruce | June 23, 1942 |
| 2,333,272 | Ridings | Nov. 2, 1942 |
| 2,356,116 | Ridings | Aug. 15, 1944 |
| 2,365,741 | Wise | Dec. 26, 1944 |
| 2,386,263 | Ridings | Oct. 9, 1945 |
| 2,474,257 | Kleinschmidt | June 27, 1949 |
| 2,503,311 | Wise | Apr. 11, 1950 |
| 2,606,245 | Hall | Aug. 5, 1952 |
| 2,656,421 | Hammond | Oct. 20, 1953 |
| 2,672,503 | Hallden | Mar. 16, 1954 |